April 7, 1970 C. E. FRIESNER 3,505,443
METHOD FOR PRODUCING COATED FABRIC SHEET MATERIAL
HAVING A PREDETERMINED CONTOUR
Filed Oct. 17, 1966 4 Sheets-Sheet 1
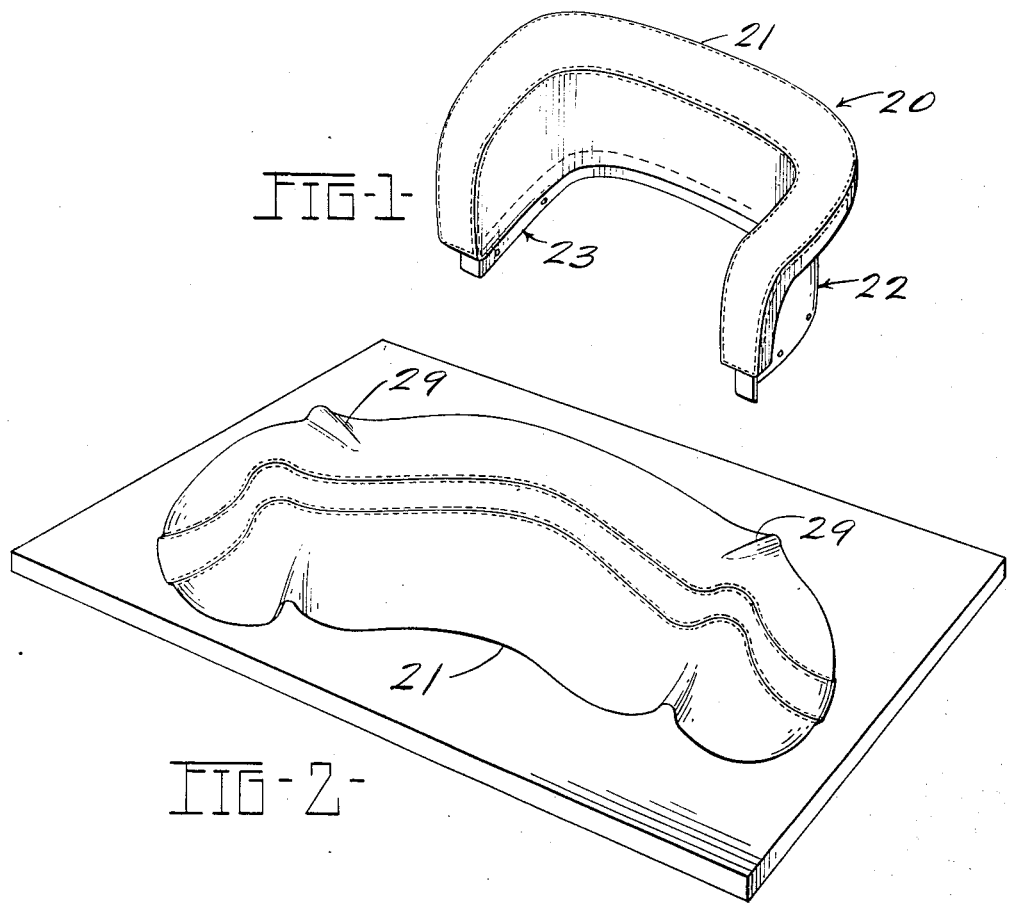
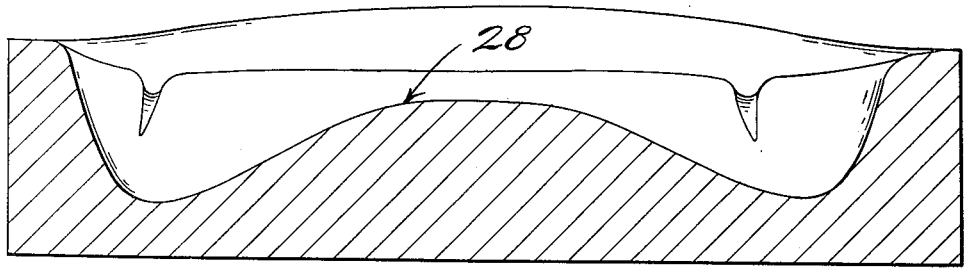
INVENTOR:
CHARLES E. FRIESNER.
BY
ATTYS.

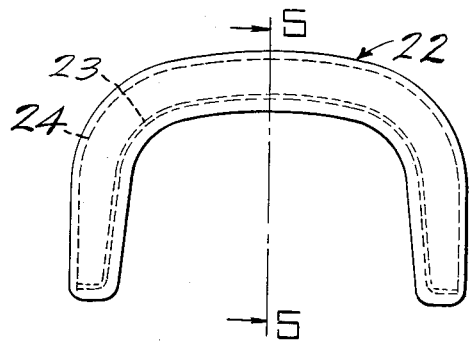
FIG-3-
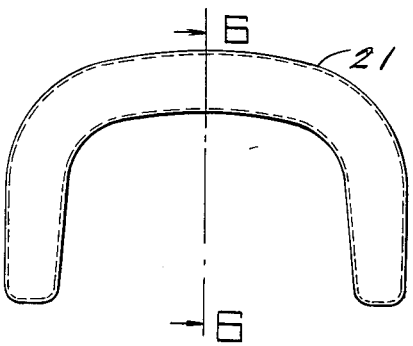
FIG-4-
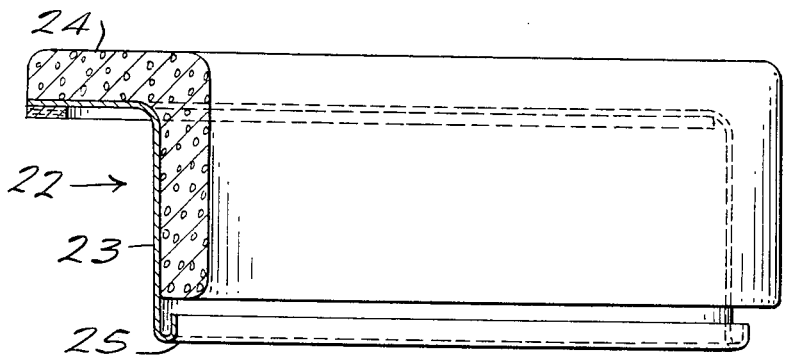
FIG-5-
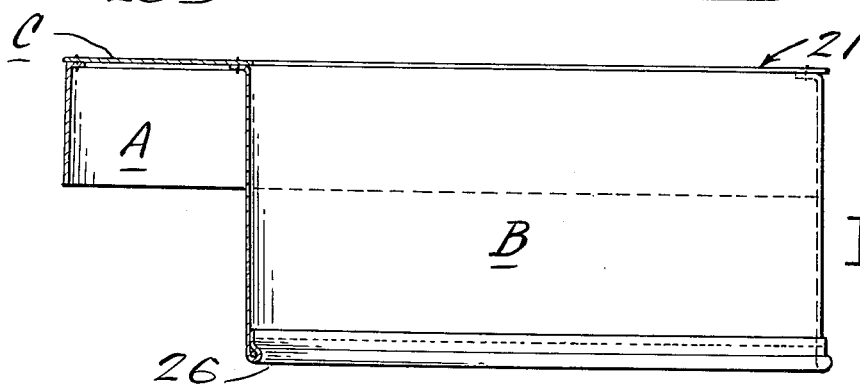
FIG-6-
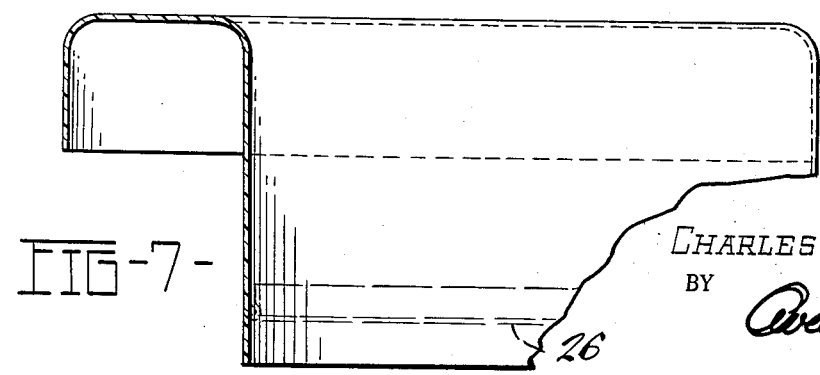
FIG-7-
INVENTOR:
CHARLES E. FRIESNER.
BY
ATT'YS

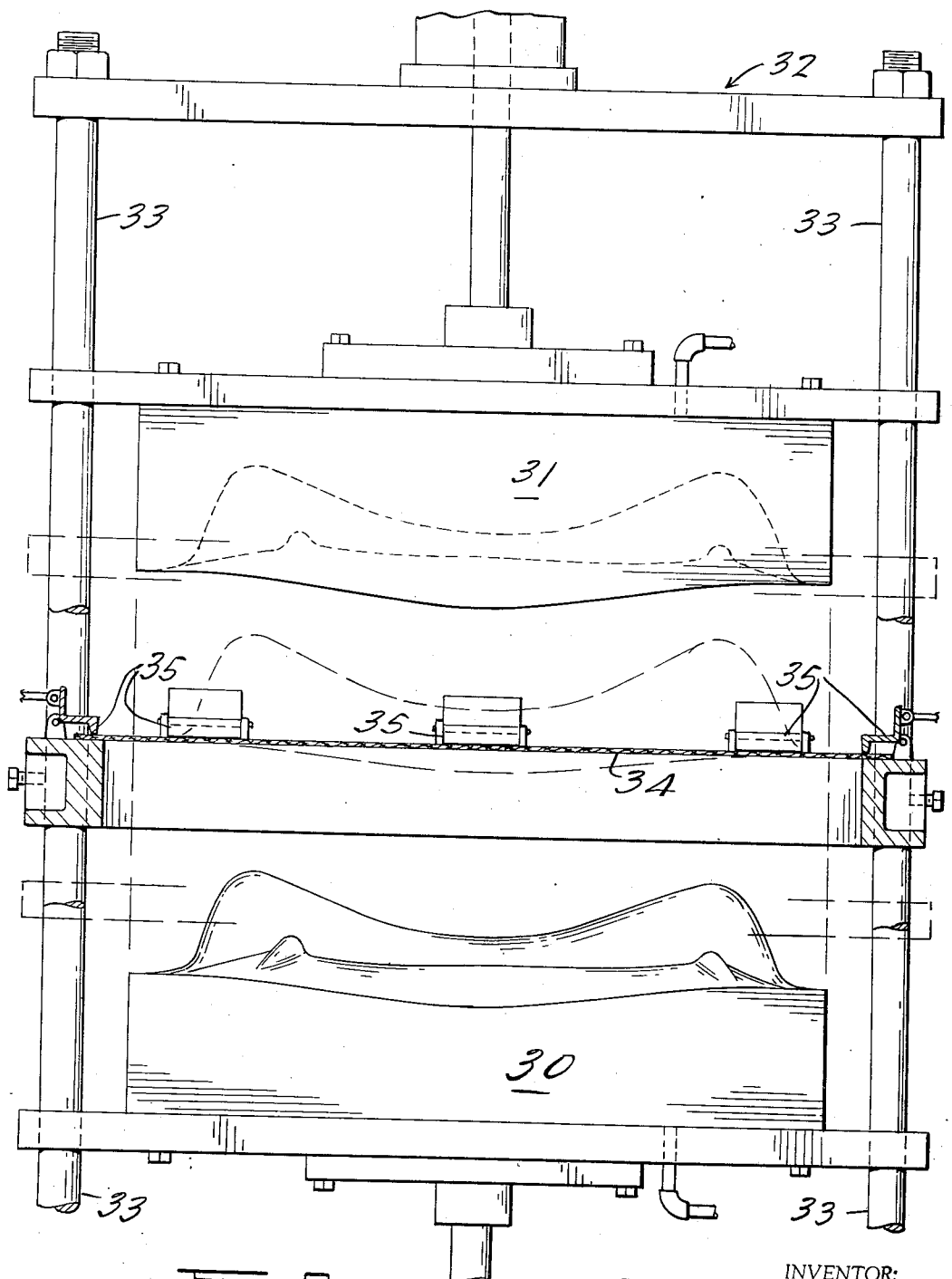

April 7, 1970 C. E. FRIESNER 3,505,443
METHOD FOR PRODUCING COATED FABRIC SHEET MATERIAL
HAVING A PREDETERMINED CONTOUR
Filed Oct. 17, 1966 4 Sheets-Sheet 4
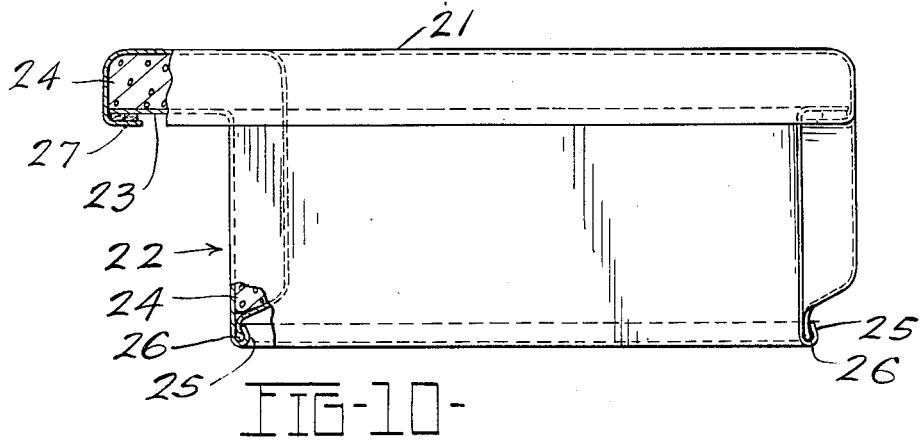
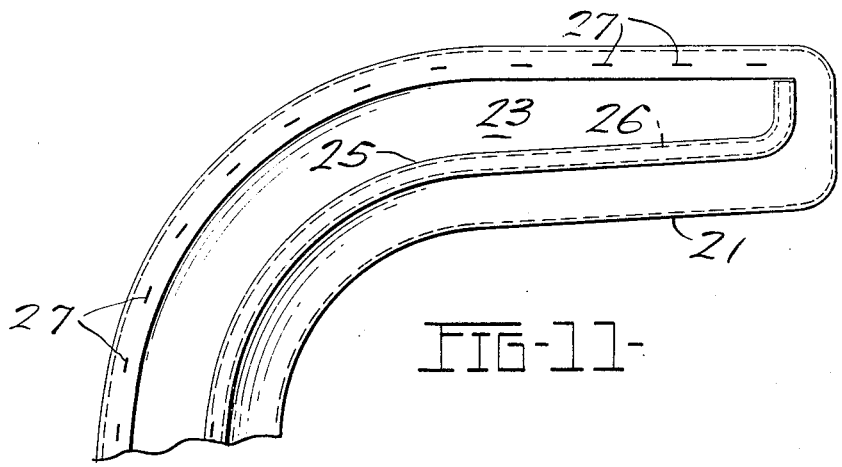
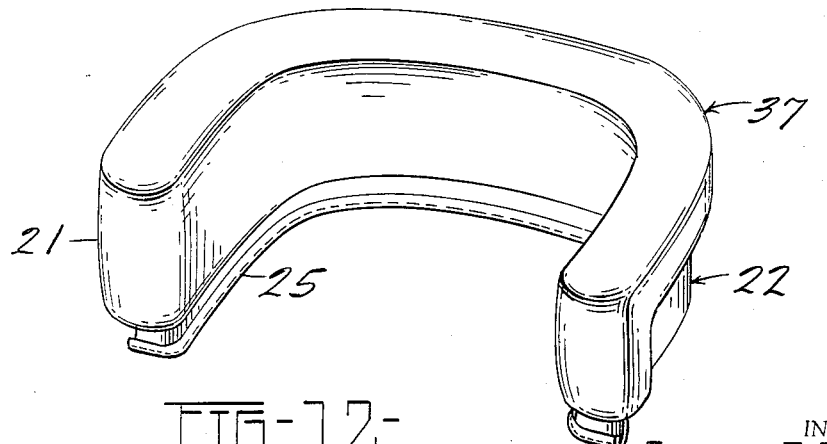
INVENTOR:
CHARLES E. FRIESNER.
BY
ATT'YS.

United States Patent Office 3,505,443
Patented Apr. 7, 1970

3,505,443
METHOD FOR PRODUCING COATED FABRIC SHEET MATERIAL HAVING A PREDETERMINED CONTOUR
Charles E. Friesner, Pemberville, Ohio, assignor to Inmont Corporation, New York, N.Y., a corporation of Ohio
Filed Oct. 17, 1966, Ser. No. 587,011
Int. Cl. B29c 1/02, 17/04; B29f 5/00
U.S. Cl. 264—92                    6 Claims

ABSTRACT OF THE DISCLOSURE

A method of producing a coated fabric product having a predetermined three dimensional contour which involves the steps of making a flexible master of the predetermined contour, rearranging the master to a configuration in which a coated fabric can be vacuum formed without substantial drawing down of the fabric, vacuum forming a piece of coated fabric in a mold having the rearranged configuration, and mechanically reforming the vacuum formed coated fabric piece to the predetermined three dimensional contour.

---

This invention relates to a method of producing vacuum formed coated fabric products having a predetermined contour. More specifically it relates to a method of producing vacuum formed coated fabric products which heretofore because of difficulty in vacuum forming have been made by the conventional cutting and sewing technique.

Coated fabric products made from sheets of coated fabrics are widely used in industry. Coated fabrics are made into such items as automobile seat covers, seat cushions, automobile convertible tops, boat cushion covers, and numerous similar products. Presently, the manufacture of such items involves cutting various pieces of coated fabric from a pattern and then sewing them together to provide a finished item of appropriate three dimensional contour. The cutting and sewing techniques involve a large expenditure in terms of time and labor to produce a finished product. Attempts have been made to manufacture vacuum formed, highly contoured coated fabric products but only limited success has been achieved. One of the factors which precludes absolute success is that, heretofore, it has been extremely difficult to vacuum form a product where the shape of the desired end product is severely contoured. This is because, due to the necessary contouring of the mold, certain areas of the coated fabric had a tendency to draw down or thin out during vacuum forming, or if the material had a limited degree of thermal elongation, it would be extremely difficult, if not impossible, to draw the coated fabric into certain areas of the mold. In addition, the coated fabric might bunch up on a severely contoured mold so that the finished product would be creased, wrinkled or pleated. Thus it can be seen that, heretofore, the vacuum molding of coated fabric products having a severely contoured configuration left much to be desired. The present invention overcomes many of the drawbacks to vacuum forming severely contoured coated fabric products.

It is an object of this invention to provide an improved method of producing vacuum formed coated fabric products which are free from undesirable creases, wrinkles and pleats.

It is a further object of this invention to provide an improved method of producing vacuum formed coated fabric products of contoured shape in which defects incurred in the forming step are substantially eliminated.

It is a further object of this invention to provide a labor saving and economical method of producing coated fabric products.

Other objects and advantages will be apparent from the description which follows, which is intended to illustrate and disclose and in no way to limit the invention, reference being made to the attached drawings, in which:

FIG. 1 is a perspective view of a tractor arm and back rest consisting of a cut and sewn coated fabric cover mounted over a subassembly apparatus;

FIG. 2 is a perspective view of the coated fabric cover of the tractor arm and back rest of FIG. 1 laid out so as to have a maximum of flatness and a minimum of curvature;

FIG. 3 is a plan view of a tractor arm and back rest subassembly apparatus with the frame shown in phantom;

FIG. 4 is a plan view of a coated fabric cover for a tractor arm and back rest.

FIG. 5 is a cross-sectional elevational view through the line 5—5 of FIG. 3;

FIG. 6 is a cross-secional elevational view through the line 6—6 of FIG. 4 showing a stitched cover;

FIG. 7 is a fragmentary cross-sectional elevational view through the line 6—6 of FIG. 4 showing a molded cover;

FIG. 8 is a cross-sectional view in elevation of a mold of the tractor arm and back rest coated fabric cover laid out as shown in FIG. 2;

FIG. 9 is a diagrammatic view of a vacuum molding apparatus;

FIG. 10 is a side elevational view with parts broken away showing a molded cover mounted on the subassembly;

FIG. 11 is a fragmentary plan view from the bottom showing a tractor arm and back rest cover mounted on a steel support frame; and FIG. 12 is a perspective view of a tractor arm and back rest in completed form consisting of a molded coated fabric cover mounted on a subassembly.

In accordance with this invention an improved method of manufacturing a vacuum formed coated fabric product of predetermined contour is provided. In its entirety, the method consists of taking a cut and sewn coated fabric master which has the desired contour of the end product, manipulating it to a position at which it can be vacuum molded without substantial drawing down of the fabric, making a mold in the shape of the rearranged master, molding a piece of coated fabric into the shape determined by the mold and removing it, whereby the newly formed piece can be made to assume the contour of the cut and sewn master, thus eliminating the necessity of cutting and sewing such pieces to obtain the desired contour.

In essence, the method comprises, as a first step, heating at least the coating of a coated fabric to a temperature sufficiently high to cause softening thereof. The coating is a synthetic thermoplastic resinous material. The second step of the method involves vacuum forming the coated fabric to the rearranged configuration which is substantially free of undercuts, and is one that a coated fabric material of the predetermined contour is capable of assuming by normal flexing. The third step of the method involves reforming the vacuum formed coated fabric into the predetermined contour.

A trim step may follow the vacuum forming step, whereby the excess fabric such as that surrounding the actual amount required to comprise the cover may be removed therefrom so as to facilitate assembly of the cover onto the support structure or assembly apparatus.

The invention will be more fully understood by reference to the drawings.

A horseshoe shaped tractor arm and back rest 20 (FIG. 1) comprises a cut and sewn coated fabric cover 21 (or master) which is mounted on and attached to a subassembly 22 (FIGS. 3 and 5). The subassembly 22 comprises an appropriately shaped steel frame 23 and foam rubber piece 24 adhered to the frame 23. The cut and sewn cover 21 can be attached to the frame in front by crimping an edge 25 of the steel frame over a beading 26 on the leading edge of the cover (FIGS. 6 and 10), and can be attached in back by staples 27 (FIG. 11) to the underside of the frame 23. The mechanism of attachment, however, is immaterial.

The cover 21 is formed by cutting a number of pieces of coated fabric A, B, C, (FIG. 6) according to patterns and then sewing the pieces together. A cross-sectional elevational view of the cut and sewn cover 21 is shown in FIG. 6 and the same cover is shown in plan view in FIG. 4. The cut and sewn coated fabric cover 21 is not rigid and can assume, by flexing, other shapes, e.g., that shown in FIG. 2. It will be observed that the arm and back rest cover 21 shown in perspective in FIG. 1 has significant contours and complex configurations whereas the same cover in the shape shown in FIG. 2 is much flatter, and has less complex configurations or curvatures and minimum undercuts. The cover 21, however, by mere flexing, can be changed from the shape shown in FIG. 2 to that shown in FIG. 1.

In the practice of the instant invention, a mold 28 (FIG. 8) is prepared which conforms, for example, to the shape of the cover 21 shown in FIG. 2. The FIG. 2 shape is one the cover 21 (of the FIG. 1 shape) is capable of assuming but it a rearranged shape to provide a minimum of curvature and undercuts. It will be noted that wrinkles or creases 29 appear in the shape (FIG. 2) of the cover 21; these are incorporated in the mold 28, which can be made of an epoxy resin composition, of gyysum, or of any other suitable material, as will be apparent to those skilled in the art. Cooeprating male and female molds 30 and 31 (FIG. 9) are then prepared from the mold 28, and the molds 30 and 31 are then attached to a vacuum forming apparatus 32 shown schematically in FIG. 9. The apparatus 32 comprises the male and female molds 30 and 31 mounted for vertical reciprocating movements on steel bars or stanchions 33, and means for holding a section of coated fabric 34 intermediate the male and female molds. Spring loaded angle irons 35, mounted along the periphery of an open centered support frame as shown, are suitable as holding menas. Vacuum forming apparatus is well known to those skilled in the art and will not be further described here. In the vacuum forming process a section of coated fabric 34 is taken and heated in a furnace or by other means to soften the coat and is then inserted between the male and female molds 30 and 31, shown in FIG. 9, stretched in a general horizontal and unitary position between the molds and held by angle irons 35. The molds are then brought into cooperating relationship with each other and a vacuum applied. After the coated fabric material is molded it is removed from the mold, trimmed and fitted on a tractor arm and back rest subassembly (FIG. 5) and fastened thereto by means which have been heretofore described. The configuration of the molded piece 36 shown in cross section in FIG. 7 has the same shape as the cut and sewn piece 21 of FIGS. 4 and 6 when it is mounted on the subassembly, as exemplified by the completed tractor arm and back rest 37 shown in (FIG. 12.)

In the vacuum forming operation, it is preferred to use a male and female mold to insure that the coated fabric is formed exactly to the desired configuration, however, a female mold alone could be used if a strong enough vacuum was applied.

In the practice of this invention the coated fabric to be vacuum formed must be heated to the point where at least the coating softens and becomes flexible, thus in that manner the shape imparted during vacuum forming will be retained after the piece has cooled. The temperature at which the coat softens will vary depending on the composition of the coat.

If desired, the coated fabric can also be lubricated before the heating step by spraying it with water or other lubricating liquid. This procedure makes the substrate more flexible and is described in co-pending patent application No. 550,312.

The "coat" of the coated fabric can be of any thermoplastic resin and of any reasonable thickness; preferably it is about 12 mil thick.

Numerous examples of synthetics resins suitable for use in producing coated fabrics are known to those skilled in the art. These synthetic resins can be generally described as organic materials produced by polymerization or condensation of one, two, or less often three simple compounds. The properties of synthetic resins vary with their composition, method of formation, and additives. Suitable examples of families of synthetic resins which can be so used include polyvinyl chloride or copolymers thereof, exemplified by the "Geon" vinyl resins manufactured by the B. F. Goodrich Company, the "Marvinol" resins manufactured by the U.S. Rubber Company, the "Trulon" resins manufactured by the Thompson Chemical Company and chlorinated polyethylene resins manufactured by the Allied Chemical Company. It is preferred to use polyvinyl chloride resins in the practice of this invention. Specific examples of operable resins include Trulon 630 and 690, Marvinol VR–26, or VR–56. Preferably a double layered coated fabric is used where the first layer has a temperature of total fusion at least about 20° below the temperature at which the second layer has a plastic memory. This enables any embossing present to be maintained during the molding operation. Such double layer systems are described in copending application No. 569,593.

It is to be understood that while flexible thermoplastic synthetic resins are the essential constituents of the coatings, other ingredients may be added. Additives such as plasticizers, lubricants, fillers, dyes, pigments, stabilizers, etc. are conventionally used in producing coated fabrics. The additives have perhaps the greatest influence on the properties exhibited by the final products. These additives have the general effect on the synthetic resin of affecting the degree of hardness, the ease of material processability, resistance to abrasion and chemicals, and the final finish of the material.

It will be apparent that the type of fabric forming the subtrate for the coating is immaterial, the only requirement being that it must be capable of being adhered to the coating and be flexible and strong enough for vacuum forming to the shape desired. The fabric substrate can be made of cotton, wool, silk, nylon, polypropylene, etc., and can also be woven, knitted, or non-woven. Nonwoven fabrics can be formed by bonding of the textile fibers by means of a vinyl latex. If a woven fabric substrate is to be used, however, it is preferred to use a fabric wherein the yarns forming the warp have good stretch characteristics. Examples of such yarns are cotton, silk, and nylon. This is in order to insure that there are no thin spots in the molded product due to limited stretchability of the fabric substrate.

The exact configuration to which the cut and sewn coated fabric product master is to be arranged for the purpose of making a mold therefrom will vary from piece to piece, but should be of a configuration which has a minimum of undercuts and which will result in the elimination of drawing down or thinning out of the fabric during the forming step.

In forming the mold for this invention a finished cut and sewn master need not be used in the layout, but rather a flexible material that has the shape of the finished cut and sewn part can be used, i.e., the mold could be prepared by coating a wooden model or any material model with a flexible film-forming material such as a silicone and then removing the material when it is dry and using it as above with a cut and sewn part.

The following examples are illustrations of the practice of this invention, however, this invention is in no sense to be limited to the illustrations set forth.

EXAMPLE I

A cut and sewn coated fabric (the "coat" comprising two layers of polyvinyl chloride resin, a first layer of a mixture of Trulon 620 and Trulon 630, and a second layer integral therewith of Trulon 690, all manufactured by the Thompson Chemical Corporation, and the fabric substrate being woven cotton) tractor arm and back rest cover was taken and laid out and arranged so that it had the minimum number of undercuts and maximum of flatness. A mold of expoxidized resin was then made from the so arranged cover and a male and female mold was obtained therefrom in a manner well known in the art. The two molds were then placed in a vacuum forming apparatus.

An approximately 4 ft. x 5 ft. sheet of the same type of coated fabric was stretched in a flat sheet, held by clamps at the edges, and placed in a furnace and heated to a temperature of between 260–280° F. where the coat was softened. After heating the piece was removed from the furnace and placed between the male and female molds of the vacuum forming apparatus, a partial vacuum applied, and the fabric was urged into intimate contact with the molds. The fabric was left in the molding apparatus for approximately 15 seconds and was then cooled and removed and placed on a tractor arm and back rest subassembly apparatus. The now molded coated fabric cover corresponded exactly to the dimensions of the subassembly apparatus and was free from wrinkles and thin spots.

EXAMPLE II

A cut and sewn coated fabric of the same type as in Example I conforming to the shape of an automobile bucket seat was taken and laid out on a board and flexed and so arranged so that it had a maximum flatness and a minimum number of undercuts. After so arranging, the cut and sewn product had an epoxy resin mold made therefrom and male and female molds were made from it in a manner well known in the art. The male and female molds were then mounted on a vacuum forming apparatus. Another sheet of material of the same composition was obtained, stretched between clamps at the edges, sprayed with water, and placed in a furnace and heated to approximately 270° F. wherein the coat softened. After this was accomplished the sheet was then placed between the male and female molds of the vacuum forming apparatus and a partial vacuum was applied and the sheet was urged into intimate contact with the molds. The sheet remained in into molding apparatus for approximately 20 seconds and was thereafter cooled and removed. The now molded cover was then drawn onto an automobile bucket seat subassembly and it conformed to that shape being free of wrinkles and distortions.

Coated fabric products molded in accordance with the above described method can be made quicker and more cheaply than a cut and sewn product.

An additional benefit of this method is that less material is actually required for the operation than is required with the cut and sewn type operation. Waste of material is reduced substantially.

What I claim is:

1. A method of producing a coated fabric product having a predetermined three dimensional contour, which method comprises making a flexible master of said predetermined contour, mechanically flexing the master to a rearranged configuration which has a minimum of curvature and undercuts, and which is a configuration from which a mold may be prepared which a coated fabric can be vacuum formed without substantial drawing down of the fabric, producing a mold having the rearranged configuration, vacuum forming a piece of coated fabric in the rearranged configuration of the mold, and mechanically flexing the vacuum formed coated fabric piece into said predetermined three dimensional contour.

2. A method of producing a coated fabric product having a predetermined three dimensional contour, which method comprises removing a cut and sewn master that is in contact with a form having such predetermined contour, mechanically flexing the master to a rearranged configuration which has a minimum of curvature and undercuts and which is a configuration from which a mold may be prepared in which a coated fabric can be vacuum formed without substantial drawing down of the fabric, producing a mold having the rearranged configuration, vacuum forming a piece of cooated fabric in the rearranged configuration of the mold, and mechanically flexing the vacuum formed coated fabric piece into the predetermined contour in contact with a form having such predetermined three dimensional contour.

3. A method of producing a cooated fabric product having a predetermined three dimensional contour, which method comprises removing a cut and sewn coated fabric pattern that is in contact with a form having such predetermined contour, mechanically flexing the pattern to a rearranged configuration which has a minimum or curvature and undercuts and which is a configuration from which a mold may be prepared in which a coated fabric can be vacuum formed without substantial drawing down of the coated fabric, producing a mold having the rearranged configuration, heating at least the coating of a piece of such coated fabric wherein the coating is thermoplastic to a temperature sufficiently high to cause softening thereof, vacuum forming said heated piece in the rearranged configuration of the mold, and mechanically flexing the vacuum formed coated fabric piece into the predetermined contour in contact with a form having such predetermined three dimensional contour.

4. A method of producing a coated fabric product having a predetermined three dimensional contour, which method comprises heating at least the coating of a coated fabric wherein the coating is thermoplastic to a temperature sufficiently high to cause softening thereof, vacuum forming the heated coated fabric to a rearranged configuration of a mold, the rearranged configuration of the mold conforming to one produced by mechanical flexing of a flexible master having the predetermined contour to a rearranged configuration which has a minimum of curvature and undercuts, and which is a configuration from which a mold may be prepared in which a coated fabric can be vacuum formed without substantial drawing down of the fabric, and mechanically flexing the vacuum formed coated fabric into the predetermined three dimensional contour in contact with a form having such contour.

5. The method of claim 4 in which the coating is polyvinyl chloride.

6. A method of producing a coated fabric product having a predetermined three dimensional contour, which method comprises vacuum formnig a piece of coated fabric to a rearranged configuration in contact with a surface of a mold having the rearranged configuration, wherein the rearranged configuration conforms to one produced by mechanical flexing of a flexible master having the predetermined contour to a rearranged configuration which has a minimum of curvature and undercuts, and which is a configuration from which a mold may be prepared in which the coated fabric can be vacuum formed without substantial drawing down of the fabric, and thereafter mechanically flexing the vacuum formed coated fabric into the predetermined theree dimensional contour.

References Cited

UNITED STATES PATENTS

| | | | |
|---|---|---|---|
| 2,431,745 | 12/1947 | Flanagan | 117—76 |
| 2,986,777 | 6/1961 | Carter | 264—101 |
| 3,065,096 | 11/1962 | Marsden et al. | 117—76 |
| 3,108,327 | 10/1963 | Phillips et al. | 264—226 |
| 3,369,949 | 2/1968 | Forrest | 264—220 |

ROBERT F. WHITE, Primary Examiner

J. R. THURLOW, Assistant Examiner

U.S. Cl. X.R.

28—91.1, 407; 264—101, 227, 294